W. NOAKES.
SAUCEPAN COVER.
APPLICATION FILED MAR. 14, 1911.
1,021,066.
Patented Mar. 26, 1912.
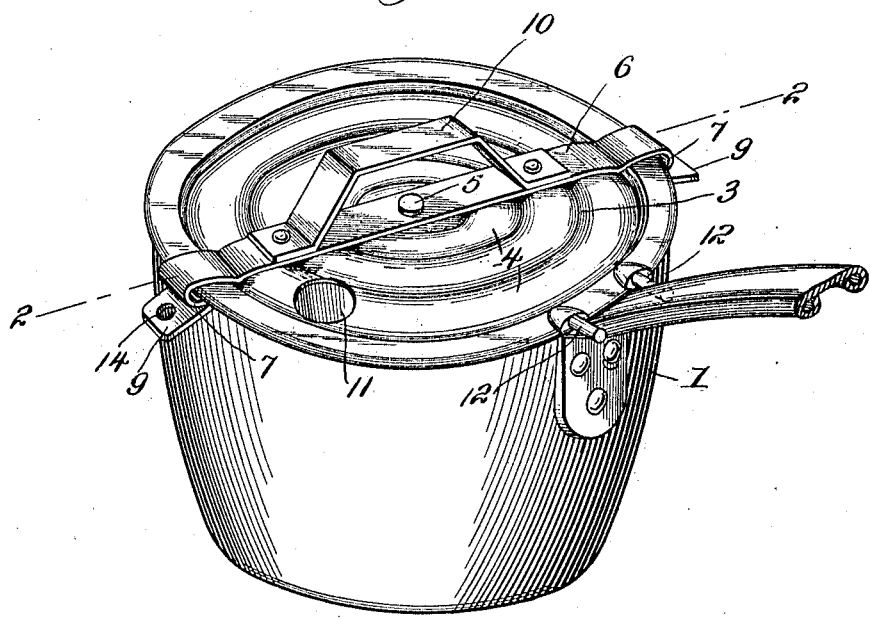
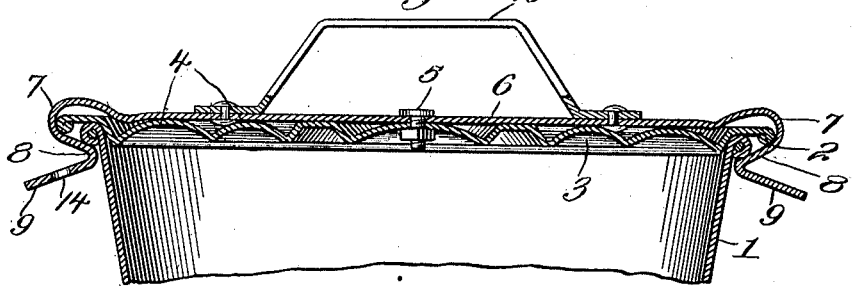
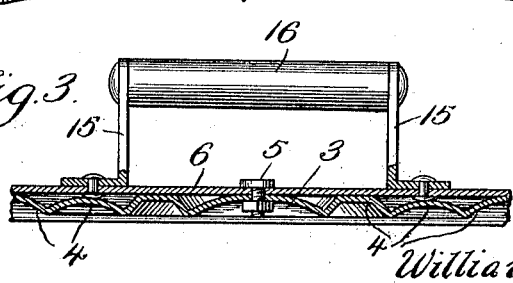
Inventor
William Noakes.
By Victor J. Evans,
Attorney
Witnesses

UNITED STATES PATENT OFFICE.

WILLIAM NOAKES, OF PORTLAND, OREGON.

SAUCEPAN-COVER.

1,021,066. Specification of Letters Patent. Patented Mar. 26, 1912.

Application filed March 14, 1911. Serial No. 614,353.

*To all whom it may concern:*

Be it known that I, WILLIAM NOAKES, a citizen of the United States, residing at Portland, in the county of Multnomah and State of Oregon, have invented new and useful Improvements in Saucepan-Covers, of which the following is a specification.

This invention relates to saucepan covers, and it has for an object to provide a cover of this character which is constructed so as to readily permit the saucepan to be drained when desired without removing the cover and without liability of the cover accidentally falling from the saucepan when the latter is canted during the drawing operation.

Another object of the invention is to provide the cover with a drain orifice and a movable handle provided with means for engaging the saucepan to hold the cover closed thereagainst and provided further with means for closing the drain orifice and to further provide the cover with securing devices to engage the handle of the saucepan so as to prevent accidental rotation of the cover on the saucepan when the handle of the cover is rotated to expose the drain orifice.

In the drawing, forming a portion of this specification and in which like numerals of reference indicate similar parts in the several views:—Figure 1 is a perspective view of my improved cover showing the same applied to a saucepan. Fig. 2 is a section through the saucepan and through the cover taken on the line 2—2 of Fig. 1. Fig. 3 is a section through a portion of the cover showing a slightly modified form of handle.

The saucepan 1 may be of any well known construction, but preferably of a design or form wherein the walls of the saucepan at the open end thereof are formed to provide a continuous circumferential reinforcing bead 2.

My improved cover 3 is preferably constructed from suitable sheet material of a configuration conforming substantially with the upper open end of the saucepan so as to securely cover the open end. The cover, with a view of presenting thereto considerable rigidity, is formed with one or more concentric reinforcing bulge or bead portions 4. At the center, the cover has pivoted thereto, as at 5, a relatively flat member 6, the end portions of the member being extended downwardly over the side edge of the cover and over the side of the reinforcing bead of the saucepan, as at 7, and then inwardly to provide a bead-engaging element 8, the said portion 8 being formed by bending the extremity of the member 6 on itself and then constructing the extremity to provide a lip or manipulating piece 9 which extends downwardly at an angle from beneath the cover to a position where it may be conveniently grasped by the hand. The extremities of the member 6 are somewhat springy so as to permit the bead-engaging element 8 to be readily engaged with or disengaged from the bead of the saucepan.

The member 6 is provided with a handle 10 formed, as shown in Fig. 1 of the drawing, from a single piece of flat metal having its central portion disposed above the central portion of the member 6 and sufficiently spaced therefrom to permit it to be readily grasped by the hand. The end portions of the handle are bent downwardly and secured in any suitable well known manner to the member 6. The cover is provided with a drain opening 11 which is located preferably near the edge of the cover and disposed in the path of movement of the member 6 so that it may be wholly closed thereby at the will of the operator. To prevent the cover from rotating on the saucepan when the member 6 is rotated to expose the drain opening, I provide the cover with a pair of spaced fingers 12 which are designed to straddle the handle of the saucepan, as illustrated in Fig. 1 of the drawing.

From the construction described it will be seen that by forming the extremities of the member 6 as described, the cover can be conveniently applied to the open end of the saucepan and after cooking, should it be desired to drain the saucepan the member 6 can be rotated on the cover to expose the drain opening therein. The saucepan can then be partly or wholly canted to permit the water to flow from the saucepan without any liability of the cover accidentally falling off. One of the lips 9 is formed with an aperture 14 to receive a supporting hook when it is desired to hang the cover on a suitable support when not in use.

In the modified form of the closure shown in Fig. 3 of the drawing, the member 6 is provided with suitable upstanding ears 15 and secured therebetween is a suitable wooden handle 16.

I claim:

1. A saucepan including a cover therefor provided with a drain opening, a rotatably mounted member movable across the opening and having integral movable extremities extended beneath a portion of the cover and engaging the upper edge of the saucepan to hold the cover against displacement therefrom, the said extremities of the member being formed to provide manipulating lips adapted for manual manipulation to release the member from the saucepan, and means for holding the cover against rotation on the saucepan.

2. A saucepan having a handle thereon, a cover closing the open end of the saucepan and provided with a drain opening therein, a rotatably mounted member movable across the opening and having its extremities extended beneath a portion of the cover and engaging the upper edge of the saucepan to hold the cover against displacement therefrom, the said extremities of the member being formed to provide manipulating lips adapted for manual manipulation to release the member from the saucepan, and means on the cover straddling the handle of the saucepan to prevent rotation of the cover on the saucepan on rotation of the member.

In testimony whereof I affix my signature in presence of two witnesses.

WILLIAM NOAKES.

Witnesses:
 H. H. NEWHALL,
 F. W. ALT, Jr.

Copies of this patent may be obtained for five cents each, by addressing the "Commissioner of Patents, Washington, D. C."